United States Patent
Towfiq et al.

(10) Patent No.: US 10,419,957 B2
(45) Date of Patent: Sep. 17, 2019

(54) HIGH-VOLUME WIRELESS DEVICE TESTING

(71) Applicant: Promptlink Communications, Inc., Oceanside, CA (US)

(72) Inventors: Foad Towfiq, Vista, CA (US); Adib Towfiq, Oceanside, CA (US); Alehander Podarevsky, Oceanside, CA (US); Antonin Shtikhlaytner, Kiev (UA)

(73) Assignee: Promptlink Communications, Inc., Oceanside, CA (US)

( * ) Notice: Subject to any disclaimer, the term of this patent is extended or adjusted under 35 U.S.C. 154(b) by 0 days.

(21) Appl. No.: 14/278,028

(22) Filed: May 15, 2014

(65) Prior Publication Data

US 2018/0146384 A1 May 24, 2018

(51) Int. Cl.
*H04W 24/06* (2009.01)
*G06F 9/445* (2018.01)
(Continued)

(52) U.S. Cl.
CPC .......... *H04W 24/06* (2013.01); *G06F 9/4451* (2013.01); *H04L 41/0843* (2013.01); *H04L 43/50* (2013.01); *H04L 67/303* (2013.01); *H04L 67/306* (2013.01); *H04W 72/082* (2013.01); *H04W 72/085* (2013.01);
(Continued)

(58) Field of Classification Search
CPC .......... H04W 24/06; H04W 72/085; H04W 72/082; G06F 9/4451; H04L 67/306
See application file for complete search history.

(56) References Cited

U.S. PATENT DOCUMENTS

| | | |
|---|---|---|
| 4,450,335 A | 5/1984 | Shimizu et al. |
| 6,741,277 B1 | 5/2004 | Rau |

(Continued)

OTHER PUBLICATIONS

International Search Report & Written Opinion received for PCT Patent Application No. PCT/US2013/000201, dated Apr. 8, 2014, 6 pages.

(Continued)

*Primary Examiner* — Brian D Nguyen
(74) *Attorney, Agent, or Firm* — Dentons US LLP

(57) ABSTRACT

Wireless consumer premises equipment (CPE) devices are provisioned with their wireless functionality disabled. Selected wireless CPE devices have their wireless functionality turned on, and testing of the selected wireless devices, including testing of their wireless functionality, is performed. After testing has been completed, the selected wireless devices are placed in a predetermined default operational profile suitable for subsequent end consumer deployment. A wireless interference and wireless channel saturation minimization action is performed in relation to the selected wireless devices so that their wireless functionality does not affect subsequent testing of the wireless functionality of other wireless CPE devices. Testing can be performed using a system including a primary test platform, a wireless interface communicatively connected to the primary test platform, and a mobile and/or stationary test rack (s) communicatively connected to the primary test platform and that has individual slots into which corresponding wireless devices are connected.

20 Claims, 3 Drawing Sheets

(51) Int. Cl.
*H04L 29/08* (2006.01)
*H04W 72/08* (2009.01)
*H04L 12/24* (2006.01)
*H04L 12/26* (2006.01)
*H04W 84/14* (2009.01)

(52) U.S. Cl.
CPC ............ *H04W 84/14* (2013.01); *Y04S 40/162* (2013.01); *Y04S 40/168* (2013.01)

(56) References Cited

U.S. PATENT DOCUMENTS

| | | | |
|---|---|---|---|
| 7,058,559 | B1 | 6/2006 | Roeck et al. |
| 7,668,397 | B2 | 2/2010 | Le Dinh et al. |
| 7,894,349 | B2 | 2/2011 | Breed et al. |
| 9,755,766 | B2 | 9/2017 | Wadell et al. |
| 2001/0011375 | A1 | 8/2001 | Yun |
| 2002/0091966 | A1 | 7/2002 | Barton et al. |
| 2003/0101391 | A1 | 5/2003 | Man et al. |
| 2003/0229695 | A1 | 12/2003 | Mc Bride |
| 2004/0054771 | A1 | 3/2004 | Roe et al. |
| 2005/0060612 | A1 | 3/2005 | Bohan |
| 2005/0183130 | A1 | 8/2005 | Sadja et al. |
| 2005/0240852 | A1 | 10/2005 | Inaba et al. |
| 2006/0023845 | A1 | 2/2006 | Brumble |
| 2006/0085158 | A1 | 4/2006 | Cakiner |
| 2006/0101495 | A1 | 5/2006 | Yoshida et al. |
| 2007/0074261 | A1 | 3/2007 | Bowen et al. |
| 2007/0242420 | A1 | 10/2007 | Hoshino et al. |
| 2007/0247331 | A1 | 10/2007 | Angelis et al. |
| 2009/0013372 | A1 | 1/2009 | Oakes et al. |
| 2009/0089854 | A1 | 4/2009 | Le et al. |
| 2009/0092053 | A1 | 4/2009 | Olgaard |
| 2009/0168658 | A1 | 7/2009 | Russell et al. |
| 2009/0195658 | A1 | 8/2009 | Deschamp |
| 2009/0282446 | A1 | 11/2009 | Breed et al. |
| 2009/0319249 | A1 | 12/2009 | White et al. |
| 2010/0178875 | A1* | 7/2010 | Oh .......... H04B 7/022 455/63.1 |
| 2010/0261431 | A1 | 10/2010 | Olgaard |
| 2011/0069624 | A1 | 3/2011 | Olgaard |
| 2011/0072306 | A1 | 3/2011 | Racey et al. |
| 2011/0202645 | A1 | 8/2011 | Abdelal et al. |
| 2012/0126823 | A1 | 5/2012 | Lussier |
| 2012/0140081 | A1 | 6/2012 | Clements |
| 2012/0226462 | A1* | 9/2012 | Rucker ............... G06F 11/2294 702/108 |
| 2012/0246083 | A1 | 9/2012 | Bowles et al. |
| 2012/0278657 | A1 | 11/2012 | Baker et al. |
| 2012/0320784 | A1 | 12/2012 | Edwards et al. |
| 2013/0007520 | A1* | 1/2013 | Giammarresi ...... G06F 11/2294 714/32 |
| 2013/0238308 | A1 | 9/2013 | Grosso |
| 2014/0181572 | A1* | 6/2014 | Bradfield ................ G06F 11/20 714/4.11 |
| 2014/0233405 | A1 | 8/2014 | Olgaard |
| 2014/0256268 | A1 | 9/2014 | Olgaard |
| 2014/0269470 | A1* | 9/2014 | Hybertson ........ H04W 52/0225 370/311 |
| 2018/0299502 | A1 | 10/2018 | Towfiq |
| 2019/0097910 | A1 | 3/2019 | Towfiq |

OTHER PUBLICATIONS

International Preliminary Report on Patentability received for PCT Patent Application No. PCT/US2013/000201, dated Mar. 12, 2015, 6 pages.

Non-Final Office Action received for U.S. Appl. No. 14/544,387, dated Mar. 11, 2019, 16 pages.

International Search Report and Written Opinion received for PCT Patent Application No. PCT/US2013/000244, dated Mar. 21, 2014, 7 pages.

International Search Report and Written Opinion received for PCT Patent Application No. PCT/US2013/000283, dated Mar. 13, 2014, 8 pages.

International Search Report and Written Opinion received for PCT Patent Application No. PCT/US2013/000284, dated Aug. 25, 2014, 8 pages.

International Search Report and Written Opinion received for PCT Patent Application No. PCT/US2013/000285, dated Mar. 13, 2014, 8 pages.

Non-Final Office Action received for U.S. Appl. No. 13/987,766, dated Apr. 11, 2019, 10 pages.

* cited by examiner

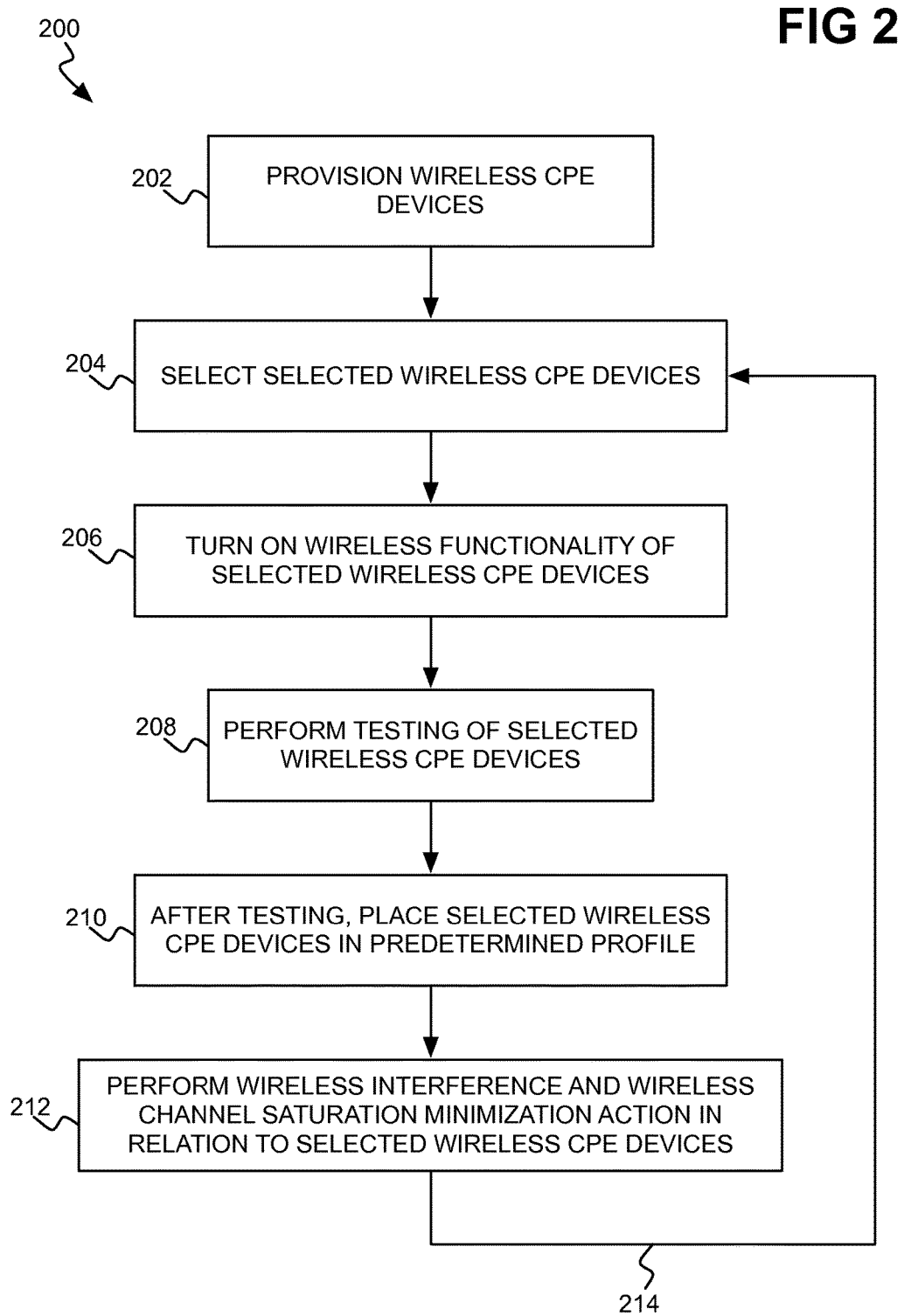

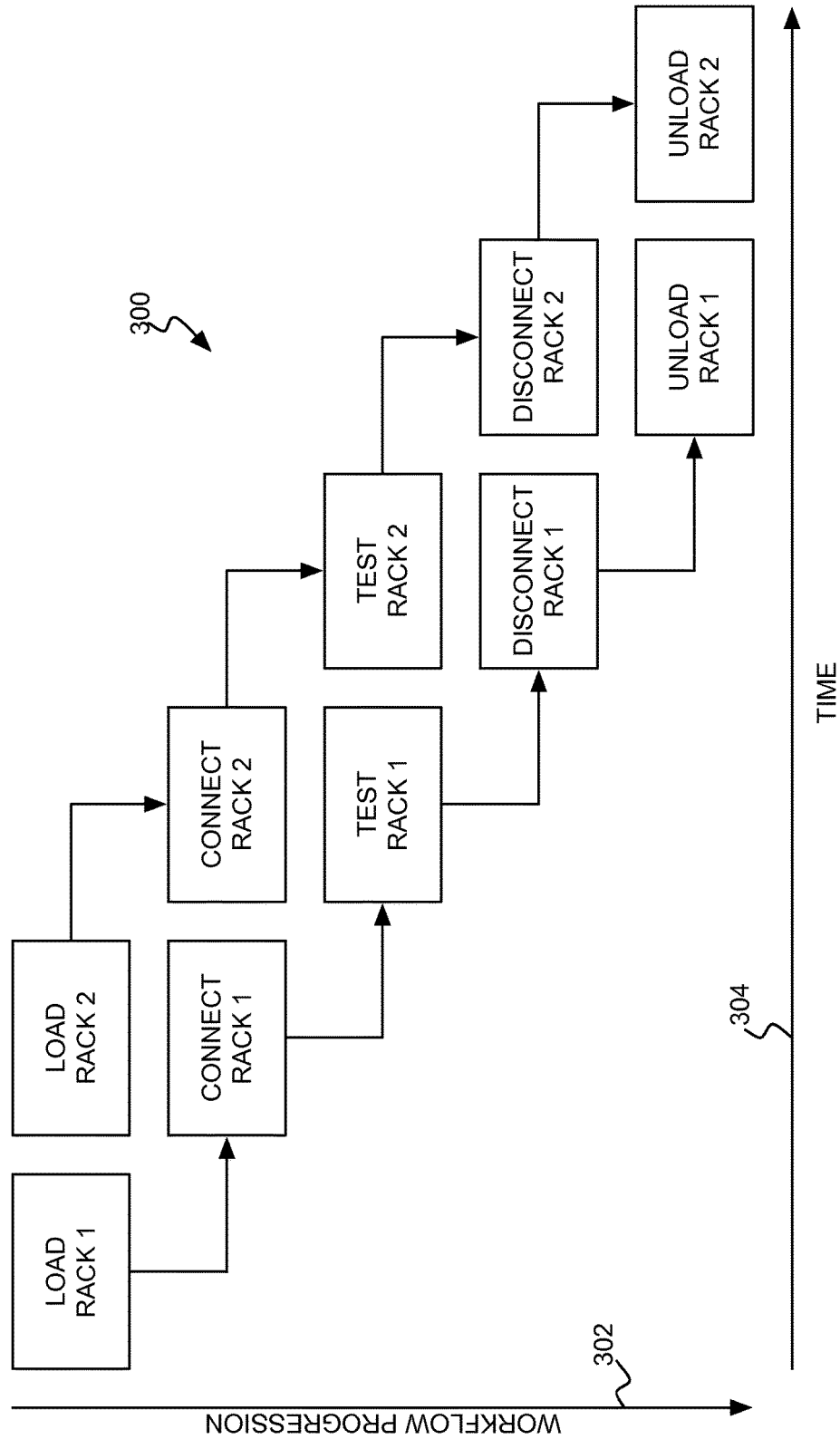

HIGH-VOLUME WIRELESS DEVICE TESTING

RELATED APPLICATIONS

BACKGROUND

Service providers, such as communications, connectivity, and content service providers, provide multimedia services, such as video, audio, telephony, data communications, wireless networking and related services to their subscribers by deploying devices at their customers' premises, and then connecting this equipment to the service provider's network and infrastructure. The deployed devices are generally referred to as customer premise equipment (CPE). For example, cable companies, more commonly known as multiple system operators (MSOs), deliver their service to customers by connecting a device, such as a set-top box, cable modem, or wireless gateway, to their network, and this CPE device acts as the service delivery mechanism for the subscriber.

The logistics of managing deployment of CPE devices may be an operational business process for some service providers, such as Internet service providers (ISPs), wireless network providers, MSOs, satellite television (TV) companies, digital subscriber loop (DSL) vendors, telecommunications companies, and so on. Providers acquire large numbers of CPE devices each year to use for delivering their subscription services to their customers. CPE devices may include TV set-top boxes, cable modems, embedded multimedia terminal adapters (EMTAs), wireless gateways, DSL modems, and devices that combine any of these capabilities in an integrated package. Thus, large quantities of CPE devices are deployed, or re-deployed, and therefore, they should be functionally tested before they go to customers.

SUMMARY

An example method includes provisioning wireless consumer premises equipment (CPE) devices, with wireless functionality of the wireless CPE devices disabled. The method includes selecting one or more selected wireless CPE devices of the wireless CPE devices, turning on the wireless functionality of the selected wireless CPE devices, and performing testing of the selected wireless CPE devices, including performing testing of the wireless functionality thereof. The method includes, after testing has been completed, placing the selected wireless CPE devices in a predetermined default operational profile suitable for subsequent end consumer deployment. The method includes performing a wireless interference and wireless channel saturation minimization action in relation to the selected wireless CPE devices so that the wireless functionality of the selected wireless CPE devices does not affect subsequent testing of the wireless functionality of other of the wireless CPE devices.

An example system includes a primary test platform to test multiple wireless consumer premises equipment (CPE) devices concurrently. The system includes a wireless interface communicatively connected to the primary test platform to provide for testing of wireless functionality of the multiple wireless CPE devices. The system includes a test rack communicatively connected to the primary test platform, and which may be mobile or stationary. The test rack includes individual slots into which individual wireless CPE devices of the multiple wireless CPE devices are connectable.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 2 is a flowchart of an example method for testing wireless CPE devices.

FIG. 3 is a diagram of an example workflow for testing wireless CPE devices using the system of FIG. 1 via the method of FIG. 2.

DETAILED DESCRIPTION

Figure 1:
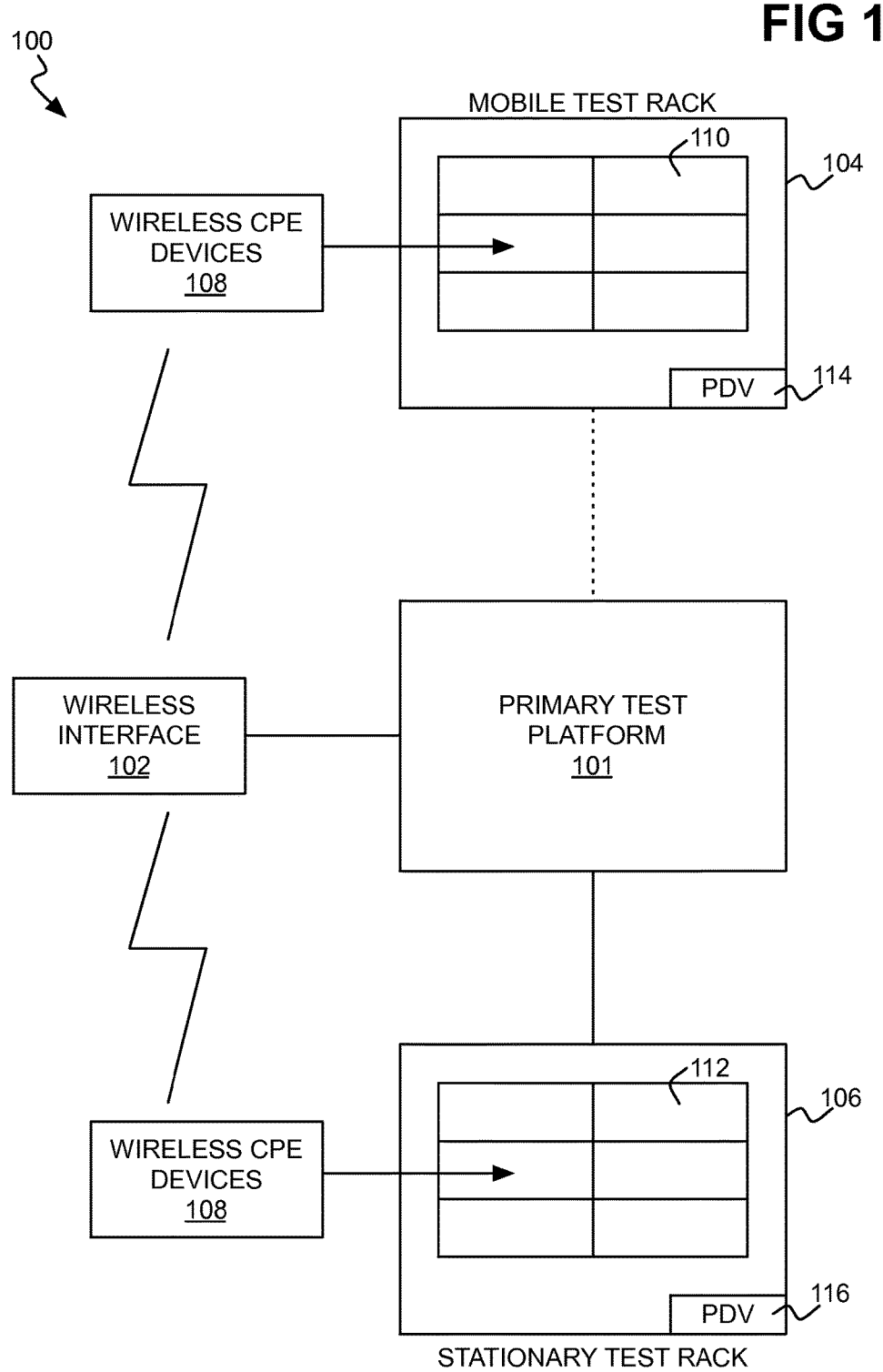
FIG. 1 is a diagram of an example system by which multiple wireless consumer premises equipment (CPE) devices are tested.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, service providers deploy customer premise equipment (CPE) devices for the use by their customers. Service providers face an operational issue of managing their stock of new and used CPE devices and maximizing the investment in these CPE devices. Thousands of CPE devices may have to be tested on a daily basis. This issue is referred to as a high-volume device testing issue.

When the CPE devices include wireless network interfaces there are unique challenges for service providers with respect to testing many devices in a high volume device-testing environment. By design, wireless gateways, wireless cable modems, and wireless routers supply an access point for computers, tablets, smart phones and other devices to connect to the wireless network. In general, a single wireless device located in one location will satisfy the connectivity needs of all users in that location.

From the reverse logistics perspective of service providers, hundreds of wireless devices have to be tested in a high-volume testing environment. This means that all devices under test are operating at the same time. However, when many wireless devices are operating in the same physical space, they compete with each other for use of the wireless bandwidth, producing interference and saturation of the wireless network channels allocated for wireless communication. This saturation and interference can hamper communication between the test platform and the devices under test. This situation will lead to false failures of the devices under test.

Techniques disclosed herein address this need for a solution to address channel saturation and interference issues in order to support high-volume processing of wireless devices. Specifically, the techniques disclosed herein solve the channel saturation and interference issues that occur when many wireless network devices are processed in a high-volume device-testing environment. Three elements in particular can be employed in combination.

First, a hardware configuration for the test platform is provided that specifically supports wireless devices in a high-volume device-testing environment. This includes the overall hardware component configuration of test racks, interface connections, computer workstations or servers, and other network devices, all of which comprise the physical architecture of the system. Test racks allow space for devices, and interfaces to connect multiple wireless devices that are going to be tested. Also, a specific innovation is that test racks have power distribution units to enable the process of selective testing of devices.

Second, software algorithms are provided that operate in conjunction with the hardware features of the test platform and the algorithms implement functional verification methods on many wireless devices under test, applying selective wireless network activation and de-activation so as to minimize wireless network channel saturation and interference issues that occur under high-volume device testing conditions. This software element includes a specific innovation of flexibility to accommodate different testing processes depending on different characteristics, such as the device vendor or model, the service provider's desired operational profile for the device, where the profile determines configuration settings to use to test the device, as well as the condition in which to leave the device when the test completes.

Third, a process is provided, which is defined in the software to make use of the hardware. The process also executes steps for testing high-volumes of wireless networking devices without allowing wireless network channels to become saturated, or to experience interference. In other words, the test process specifically includes a workflow that is aware of the wireless network operation issues, and therefore, accommodates operation methods that minimize wireless interference and wireless channel saturation.

CPE devices that use wireless interfaces, called wireless devices herein, may be tested and verified to be operational by using a wireless testing platform for simulating operating conditions of the environment in which the wireless devices are intended to operate. Wireless devices, such as wireless cable modems, wireless digital subscriber loop (DSL) modems, wireless gateways, and wireless routers may be treated as commodities that are verified to behave as the customer intends within an operational environment that may be associated with the customer's premises, and related to the service they subscribe to from the content service provider. The wireless testing platform is a specific instance of a universal platform for test and verification of CPE devices.

Wireless device testing is performed by the platform by establishing a connection between a test computer controlled by the platform and the device under test. Parallel testing occurs when the platform manages many test computers connected to many devices under test. Besides controlling the test computers, the platform also controls the operation of the wireless devices under test. Thus, the platform configures the device to operate a wireless network in a specific wireless channel, and to use other specific parameters or identifiers associated with the wireless network it creates and operates, and therefore, the platform can direct testing processes toward the device using the wireless connection it establishes in conjunction with the device.

High volume device testing of wireless devices may test and verify many wireless devices at the same time when a specific test process is employed that overcomes wireless network saturation caused by operating many wireless devices in the small space of the wireless testing platform.

Under conditions of high volume device testing of wireless devices, any wireless devices in operation within 100 feet (or more) of the platform may interfere with the testing functions, and thereby degrade the test environment or introduce false test results for the tests of specific devices. The invention applies a specific wireless device testing process and operation process to specifically minimize the interference caused by the normal operation of a wireless device while it is under test.

Wireless device testing with minimized channel saturation and interference uses a process that manages the time when each wireless device connected to the platform is enabled and disabled, and configured for using specific channels of wireless network operation. Active management of all connected wireless devices is a collective process that the platform performs, switching the focus of the platform to specific wirelessly connected devices on specific channels (as opposed to ALL wirelessly connected devices on random channels), and thereby isolating operation of each wireless network that each connected device creates.

Furthermore, wireless device testing with minimized channel saturation and interference "parks" a wireless device in a specific wireless profile as a step in the process such that a device that has completed testing and passed may be setup for re-use and re-deployment according to the service provider's operations and deployment plan. Parking a wireless device may also include turning off power to the device, so that it stops transmitting wirelessly, and therefore, this parking process eliminates interference and saturation effects of already tested wireless devices.

Wireless device testing using the platform includes power management controlled by the platform. An intelligent power management process will use computer controlled messaging over the shared media of the platform to perform dynamic powering on, or powering off, of specific wireless devices attached to the platform.

Wireless device testing using the platform includes "always on" slots of the platform, so that the intelligent power management process does not delay the automated provisioning of wireless devices attached to the platform in the "always on" slots. Therefore, operators will load the "always on" slots first, allowing firmware upgrades, provisioning, and beginning of testing to begin as soon as the first wireless devices are connected, and then, operators will load the remainder of the platform with wireless devices that are managed by the intelligent power management process. This innovation will maintain high volume performance of the test platform by eliminating delays in starting the test while other devices are being provisioned.

Software algorithms apply logic to the wireless device testing operations process. Software algorithms include pre-test conditioning, firmware upgrades if necessary, and configuration of a plurality of vendor models of wireless devices. Software algorithms also perform the functional verification process, and they perform the specific tests that are relevant for the specific wireless devices under test, and they manage the test computer that interfaces to the wireless devices. Additional software algorithms manage the inventory of wireless devices that have been tested, and the data collection and presentation of reports. Software algorithms manage the overall process of performing high volume device testing of wireless devices.

The test platform includes hardware components architected to meet specific requirements for fast and efficient manual handling of physical devices. The hardware components of the test platform include test racks. Test racks make it easy to load and unload wireless devices, meaning to place devices in the designated location and connect appropriate interfaces. Test racks have multiple locations or spaces for units under test, also known as "slots". Test rack slots have all the interface connections pre-configured in order to accommodate all the interfaces of each device under test, and along with the interface connections, there may also be test cable bundles that aggregate many cables into a single connector to speed up connection time.

The test platform includes hardware components for distribution of power to devices under test. Test racks have multiple power distribution units for controlling the power to each slot. Different test rack configurations combine with test platform features, such as shared network switches, shared media, and aggregated connectors.

Test platform throughput is improved when a set of rolling racks are used with the test platform. A rolling rack allows each test rack to be loaded and unloaded away from the central test system, thereby allowing the scarce resources of the test system to be used most efficiently. A set of test racks is provisioned, and the first loaded rack is rolled to the central test system, connected, and then when its devices are tested, the rack itself it disconnected and rolled away, while a new rack takes its place.

As demonstrated by the foregoing discussion, the techniques disclosed herein can provide certain advantages, particularly in the context of high-volume wireless device testing. The platform, overall process that minimizes saturation and interference, intelligent power management and software algorithms disclosed herein may aggregate a plurality of specific wireless device interface testing processes into a single specific instance of a universal test platform.

FIG. 1 shows an example system 100. The system 100 includes a primary test platform 101, a wireless interface 102, a mobile test rack 104, and a stationary test rack 106. The primary test platform 101, in conjunction with the wireless interface 102 that is communicatively connected thereto, performs testing of wireless CPE devices 108 connected to the test racks 104 and 106, at least some of which may be tested concurrently. The primary test platform 101 can include hardware as well as software appropriately programmed to perform testing of the wireless CPE devices 108. The wireless interface 102 permits the primary test platform 101 to test the wireless functionality of the wireless CPE devices 108. The wireless functionality can be Wi-Fi functionality, for instance.

The test racks 104 and 106 include individual slots 110 and 112, respectively, into which wireless CPE devices 108 are individually connectable. The test racks 104 and 106 also include power distribution units 114 and 116, respectively, which can selectively power on and power off the wireless CPE devices 108 connected to their slots 110 and 112, although at least some of the slots 110 and 112 may be permanently powered and cannot be powered off. Both the test racks 104 and 106 are communicatively connected or connectable to the primary test platform 101.

The mobile test rack 104 is easily movable, such as through the use of caster wheels, to permit the wireless CPE devices 108 to be loaded thereinto away from the primary test platform 101, and subsequently moved and then communicatively connected to the primary test platform 101 for testing of the devices 108. This can be advantageous where there are space constraints surrounding the primary test platform 101, and further can provide for increased testing throughput. The stationary test rack 106, by comparison, is stationary, and may be located closer to the primary test platform 101. There may be one or more of each type of test rack 104 and 106, and there may be no mobile test racks 104 or no stationary test racks 106.

The testing of the wireless functionality of the wireless CPE devices 108 is tested in a feedback loop. For instance, as to the mobile test rack 104, the primary test platform 104 transmits wireless signals via the wireless interface 102, which are received by the wireless CPE devices 108 inserted into the slots 110 of the mobile test rack 104, and which report back to the primary test platform 101 through the test rack 104. Similarly, as to the mobile test rack 106, the primary test platform 104 transmits wireless signals via the wireless interface 102, which are received by the wireless CPE devices inserted into the slots 112 of the stationary test rack 106, and which report back to the primary test platform 101 through the test rack 106.

The reverse loop can also be performed. The primary test platform 101 can, for instance, instruct the wireless CPE devices 108 connected to the mobile test rack 104 to transmit wireless signals, through the mobile test rack 104, and these wireless signals received by the primary test platform 101 via the wireless interface 102. Likewise, the primary test platform can instruct the wireless CPE devices 108 connected to the stationary test rack 106 to transmit wireless signals, through the stationary test rack 106, and these wireless signals received by the primary test platform 101 via the wireless interface 102.

FIG. 2 shows an example method 200 for testing wireless CPE devices, in conjunction with the system 100, for instance. Multiple wireless CPE devices are provisioned with their wireless functionality disabled (202). Provisioning can include connecting the wireless CPE devices to individual slots of a test rack. As noted above, some devices can be connected to slots that always have power provided thereto via a power distribution unit of the rack, whereas other devices can be connected to slots that selectively have power provided thereto via the power distribution unit of the rack.

Provisioning can include connecting some wireless CPE devices to slots of a (first) mobile rack away from the primary test platform, and then moving the mobile test rack to the primary test platform and connecting communicatively the mobile test rack to the primary test platform. Other wireless CPE devices may be connected to slots of a stationary test rack connected to the primary test platform. Furthermore, while the primary test platform is testing the wireless CPE devices, still other wireless CPE devices may be connected to a different (second) mobile test rack, which is then moved to the primary test platform.

When testing has been completed of the wireless CPE devices of the first mobile rack, the first mobile rack can be communicatively disconnected from the primary test platform, and the second mobile rack connected to the primary test platform for testing of the wireless CPE devices connected to the second mobile rack. The first mobile rack can then be moved away from the primary test platform for unloading of the wireless CPE devices. This provides for greater testing throughput of wireless CPE devices, because such devices can be loaded onto and unloaded from test racks while other wireless CPE devices are currently undergoing testing.

A subset of the wireless CPE devices provisioned in part 202 are selected (204), and are referred to as selected wireless CPE devices. The wireless functionality of the selected wireless CPE devices is turned on (206), and these CPE devices tested by the primary test platform (208). The selected wireless CPE devices may be tested in parallel or sequentially, depending on the type of test, the capability of the primary test platform, and so on. After testing has been completed, the selected wireless CPE devices are placed, or parked, in a predetermined default operational profile suitable for subsequent end consumer deployment (210), presuming that the devices passed testing.

A wireless interference and wireless channel saturation minimization action is then performed in relation to the selected wireless CPE devices (212), so that the wireless functionality thereof—which has been turned on—does not affect subsequent testing of the wireless functionality of other of the multiple wireless CPE devices provisioned in part 202. Wireless interference is to be minimized so that the wireless functionality of the selected devices does not interfere with the testing of the wireless interference of the other devices. Wireless channel saturation is to be minimized so that the wireless channels of the wireless protocol in question, such as Wi-Fi, do not become oversaturated due to the wireless functionality of the selected devices.

The action performed in part 212 can include completely powering off the selected wireless CPE devices, using the power distribution unit on the task rack to which they are connected to selectively power off just the selected devices and not other wireless CPE devices connected to the same rack. The selected wireless CPE devices may be configured to operate on a wireless channel that is not going to be used during the subsequent testing of the wireless functionality of the other wireless CPE devices, without completely powering off the selected wireless CPE devices and without disabling their wireless functionality completely. The selected wireless CPE devices may have their wireless functionality disabled, without completely powering them off, such that upon subsequent end consumer deployment of the devices the wireless functionality is then re-enabled.

As noted by the arrow 214, the method 200 can be repeated at part 204, where different wireless CPE devices are selected. The method 200 may be repeated a sufficient number of times to test all the wireless CPE devices on a given rack. The method 200 may then be performed for wireless CPE devices on a new rack (or new wireless CPE devices on the same rack). Note that the various iterations of the method 200 vis-à-vis different racks and different wireless CPE devices can overlap to at least some extent, which is now described in more detail.

FIG. 3 shows an example workflow 300 of wireless CPE device testing. The vertical downward arrow 302 indicates the order in which the steps of the workflow are performed, whereas the horizontal rightward arrow 304 denotes time. The example workflow is performed over five example steps for each of a first rack and a second rack: loading the rack with wireless CPE devices; connecting the rack to the primary test platform; testing the wireless CPE devices within the rack; disconnecting the rack from the primary test platform; and unloading the rack, in that order.

Note however, that while the first rack is being connected to the primary test platform, the second rack can be concurrently loaded. Likewise, while the wireless CPE devices of the first rack are being tested, the second rack can be connected to the primary test platform. While the wireless CPE devices of the second rack are being tested, the first rack can be disconnected from the primary test platform. Finally, while the second rack is being disconnected from the primary test platform, the first rack can already have its wireless CPE devices unloaded. Using multiple mobile test racks in this manner thus increases utilization and throughput of the primary test platform, and of the wireless CPE device testing itself.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A method comprising:
provisioning a plurality of wireless consumer premises equipment (CPE) devices, with wireless functionality of the wireless CPE devices disabled;
selecting one or more selected wireless CPE devices of the plurality of wireless CPE devices;
turning on the wireless functionality of the selected wireless CPE devices;
performing testing of the selected wireless CPE devices, including performing testing of the wireless functionality thereof;
after testing has been completed, placing the selected wireless CPE devices in a predetermined default operational profile suitable for subsequent end consumer deployment; and
performing a wireless interference and wireless channel saturation minimization action in relation to the selected wireless CPE devices so that the wireless functionality of the selected wireless CPE devices does not affect subsequent testing of the wireless functionality of other of the plurality of wireless CPE devices.

2. The method of claim 1, wherein the selected wireless CPE devices are first selected wireless CPE devices, and the method further comprises:
selecting one or more second selected wireless CPE devices, other than the first selected wireless CPE devices, of the plurality of wireless CPE devices;
turning on the wireless functionality of the second selected wireless CPE devices;
performing testing of the second selected wireless CPE devices, including performing testing of the wireless functionality thereof;
after testing has been completed, placing the second selected wireless CPE devices in the predetermined default operational profile suitable for subsequent end consumer deployment; and
performing the wireless interference and wireless channel saturation minimization action in relation to the second selected wireless CPE devices so that the wireless functionality of the second selected wireless CPE devices does not affect subsequent testing of the wireless functionality of other of the plurality of wireless CPE devices.

3. The method of claim 1, wherein performing the wireless interference and wireless channel saturation minimization action in relation to the selected wireless CPE devices so that the wireless functionality of the selected wireless CPE devices does not affect subsequent testing of the wireless functionality of other of the plurality of wireless CPE devices comprises:
completely powering off the selected wireless CPE devices.

4. The method of claim 3, wherein completely powering off the selected wireless CPE devices comprises using a power distribution unit on a test rack to which the plurality of wireless CPE devices are connected to power off just the selected wireless CPE devices.

5. The method of claim 1, wherein performing the wireless interference and wireless channel saturation minimization action in relation to the selected wireless CPE devices so that the wireless functionality of the selected wireless CPE devices does not affect subsequent testing of the wireless functionality of other of the plurality of wireless CPE devices comprises:
configuring the selected wireless CPE devices to operate on a wireless channel not used during the subsequent testing of the wireless functionality of the other of the plurality of wireless CPE devices, without completely powering off the selected wireless CPE devices.

6. The method of claim 1, wherein performing the wireless interference and wireless channel saturation minimization action in relation to the selected wireless CPE devices so that the wireless functionality of the selected wireless CPE devices does not affect subsequent testing of the wireless functionality of other of the plurality of wireless CPE devices comprises:
disabling the wireless functionality of the selected wireless CPE devices, without completely powering off the selected wireless CPE devices, until the subsequent end consumer deployment thereof.

7. The method of claim 1, wherein performing the testing of the selected wireless CPE devices comprises testing the selected wireless CPE devices in parallel.

8. The method of claim 1, wherein performing the testing of the selected wireless CPE devices comprises testing the selected wireless CPE devices sequentially.

9. The method of claim 1, wherein provisioning the plurality of wireless CPE devices comprises:
connecting the plurality of wireless CPE devices to individual slots of a test rack.

10. The method of claim 1, wherein provisioning the plurality of wireless CPE devices comprises:
connecting a first sub-plurality of the plurality of wireless CPE devices to individual slots of a test rack that always have power provided thereto via a power distribution unit of the test rack.

11. The method of claim 10, wherein provisioning the plurality of wireless CPE devices further comprises:
connecting a second sub-plurality of the plurality of wireless CPE devices to other individual slots of the test rack that selectively have power provided thereto via the power distribution unit.

12. The method of claim 1, wherein provisioning the plurality of wireless CPE devices comprises:
connecting a first sub-plurality of the plurality of wireless CPE devices to individual slots of a mobile test rack; and
moving the mobile test rack to a primary test platform and connecting the mobile task rack to the primary test platform.

13. The method of claim 12, wherein provisioning the plurality of wireless CPE devices further comprises:
connecting a second sub-plurality of the plurality wireless CPE devices to individual slots of a stationary test task connected to the primary test platform.

14. The method of claim 12, wherein the mobile test rack is a first mobile test rack, and provisioning the plurality of wireless CPE devices further comprises:
while the first sub-plurality of the plurality of wireless CPE devices are undergoing testing, connecting a second sub-plurality of the plurality of wireless CPE devices to individual slots of a second mobile test rack; and
moving the second mobile test rack to the primary test platform.

15. The method of claim 14, wherein provisioning the plurality of wireless CPE devices further comprises:
after the first sub-plurality of the plurality of wireless CPE devices have completed testing, disconnecting the first mobile test rack from the primary test platform;
connecting the second mobile test rack to the primary test platform; and
moving the first mobile test rack away from the primary test platform.

16. A system comprising:
a primary test platform to test multiple wireless consumer premises equipment (CPE) devices concurrently;
a wireless interface communicatively connected to the primary test platform to provide for testing of wireless functionality of the multiple wireless CPE devices; and
a test rack communicatively connected to the primary test platform, the test rack comprising a plurality of individual slots into which individual wireless CPE devices of the multiple wireless CPE devices are connectable.

17. The system of claim 16, wherein the test rack is stationary.

18. The system of claim 16, wherein the test rack is mobile to permit the individual wireless CPE devices to be connected to the individual slots prior to communicative connection of the test rack to the primary test platform.

19. The system of claim 16, wherein the wireless functionality of the multiple wireless CPE devices is tested in a feedback loop via the primary test platform transmitting wireless signals using the wireless interface, and the multiple CPE devices receiving the wireless signals and reporting back to the primary test platform through the test rack.

20. The system of claim 16, wherein the primary test platform is to:
select one or more selected wireless CPE devices of the multiple wireless CPE devices;
turn on the wireless functionality of the selected wireless CPE devices, such that the wireless functionality of other of the multiple wireless CPE devices remains off;
perform testing of the selected wireless CPE devices, including performing testing of the wireless functionality thereof;
after testing has been completed, place the selected wireless CPE devices in a predetermined default operational profile suitable for subsequent end consumer deployment; and
perform a wireless interference and wireless channel saturation minimization action in relation to the selected wireless CPE devices so that the wireless functionality of the selected wireless CPE devices does not affect subsequent testing of the wireless functionality of other of the plurality of wireless CPE devices.

* * * * *